United States Patent
Tanaka

(10) Patent No.: US 8,805,824 B2
(45) Date of Patent: Aug. 12, 2014

(54) DOCUMENT MANAGEMENT APPARATUS, CONTROL METHOD THEREOF, AND COMPUTER READABLE MEDIUM

(71) Applicant: Canon Kabushiki Kaisha, Tokyo (JP)

(72) Inventor: Yusuke Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/633,961

(22) Filed: Oct. 3, 2012

(65) Prior Publication Data

US 2013/0103675 A1    Apr. 25, 2013

(30) Foreign Application Priority Data

Oct. 20, 2011    (JP) ................. 2011-231096

(51) Int. Cl.
*G06F 17/30*    (2006.01)
(52) U.S. Cl.
USPC ........................................ 707/722
(58) Field of Classification Search
USPC ........................................ 707/722
See application file for complete search history.

(56) References Cited

U.S. PATENT DOCUMENTS

| | | | | |
|---|---|---|---|---|
| 8,286,085 B1* | 10/2012 | Denise | ............ | 707/705 |
| 2006/0036568 A1* | 2/2006 | Moore et al. | ............ | 707/1 |
| 2009/0198744 A1* | 8/2009 | Nakamura | ............ | 707/201 |
| 2009/0204918 A1* | 8/2009 | Matsusaka | ............ | 707/200 |
| 2009/0216724 A1* | 8/2009 | Cai et al. | ............ | 707/3 |
| 2012/0246207 A1* | 9/2012 | Evans et al. | ............ | 707/829 |

FOREIGN PATENT DOCUMENTS

JP    2007-047916 A    2/2007

* cited by examiner

*Primary Examiner* — Rehana Perveen
*Assistant Examiner* — Tiffany Thuy Bui
(74) *Attorney, Agent, or Firm* — Carter, DeLuca, Farrell & Schmidt, LLP

(57) ABSTRACT

A document management apparatus comprises: a base folder setting unit configured to set a base folder used as a base point of search processing from folders which are allocated above a folder of interest; a search unit configured to detect, from folders allocated below the base folder, a folder having a path from the base folder, which path is similar to a path from the base folder to the folder of interest, as a similar folder similar to the folder of interest; and a search result display unit configured to display a link to the similar folder detected by the search unit on a display window.

6 Claims, 13 Drawing Sheets

DOCUMENT MANAGEMENT APPARATUS, CONTROL METHOD THEREOF, AND COMPUTER READABLE MEDIUM

BACKGROUND OF THE INVENTION

1. Field of the Invention

The present invention relates to a document management apparatus and control method thereof, and a computer readable medium and, more particularly, to navigation of a document management apparatus having a folder structure for document management.

2. Description of the Related Art

As a technique for allowing easy reference to files between different folders in a document management apparatus, a technique for setting groups of respective documents, and displaying a list of documents which belong to an identical group of beyond folders is known, as described in Japanese Patent Laid-Open No. 2007-47916.

In a folder configuration, in order to facilitate document management, the user often creates folders that have the same names (or those similar names) and saves them in similar hierarchical structures. The user often wants to make operations while comparing the contents of corresponding folders that have similar folder configurations. Conventionally, a method for accessing folders by sequentially tracing folder layers as needed is available.

However, since the user has to reciprocally access folders depending on the files that are to be operated, a folder access operation causes a drop in operation efficiency. When folder layers are deep, and when there are a large number of similar folders to be compared, the number of times of operations required for accesses increases, thus lowering a user's operation efficiency.

SUMMARY OF THE INVENTION

According to one aspect of the present invention, there is provided a document management apparatus comprising: a base folder setting unit configured to set a base folder used as a base point of search processing from folders which are allocated above a folder of interest; a search unit configured to detect, from folders allocated below the base folder, a folder having a path from the base folder, which path is similar to a path from the base folder to the folder of interest, as a similar folder similar to the folder of interest; and a search result display unit configured to display a link to the similar folder detected by the search unit on a display window.

According to another aspect of the present invention, there is provided a control method of a document management apparatus, comprising the steps of: setting a base folder used as a base point of search processing from folders which are allocated above a folder of interest; detecting, from folders allocated below the base folder, a folder having a path from the base folder, which path is similar to a path from the base folder to the folder of interest, as a similar folder similar to the folder of interest; and displaying a link to the similar folder detected in the search step on a display window.

According to another aspect of the present invention, there is provided a non-transitory computer readable medium storing a program for controlling a computer to function as: a base folder setting unit configured to set a base folder used as a base point of search processing from folders which are allocated above a folder of interest; a search unit configured to detect, from folders allocated below the base folder, a folder having a path from the base folder, which path is similar to a path from the base folder to the folder of interest, as a similar folder similar to the folder of interest; and a search result display unit configured to display a link to the similar folder detected by the search unit on a display window.

Similar folders can be reciprocally accessed in a few steps without requiring any special settings for folders and documents.

Further features of the present invention will become apparent from the following description of exemplary embodiments (with reference to the attached drawings).

DESCRIPTION OF THE EMBODIMENTS

The best mode for carrying out the present invention will be described hereinafter with reference to the drawings.

First Embodiment

[System Arrangement]

Figure 1:
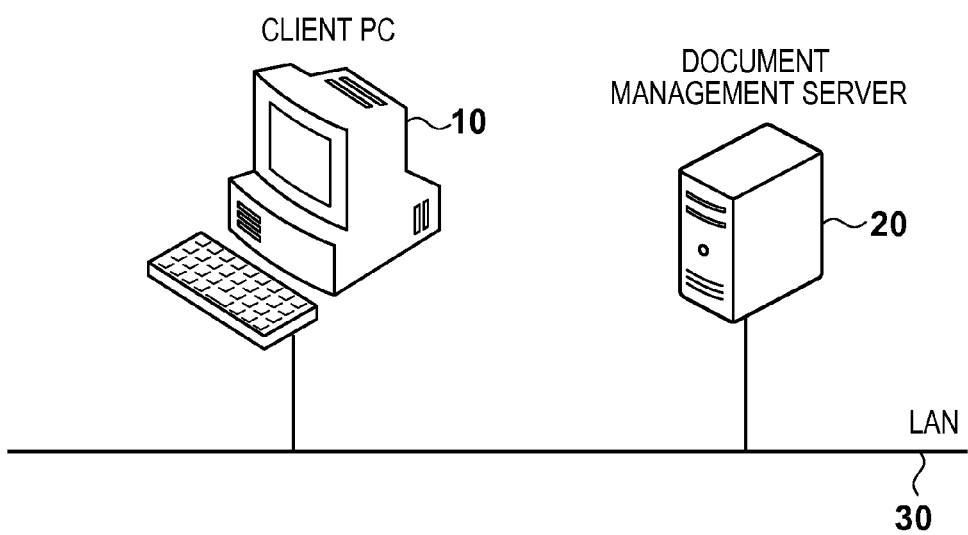
FIG. 1 is a view showing the system arrangement of a document management system according to the first embodiment.

FIG. 1 is a view showing an example of the system arrangement of a document management system according to the first embodiment of the present invention. In this embodiment, the document management system includes a client PC 10 and document management server 20, which are connected via a LAN 30. The client PC 10 provides a function of allowing the user to connect to the document management server 20 and to operate contents via a browser (not shown). The document management server 20 as a document management apparatus provides a document management function of managing contents such as documents and folders, and a Web application server function.

Note that in this embodiment, the user operates the client PC 10. Alternatively, the user may operate on the document management server 20 side. In the document management system according to this embodiment, the user accesses the document management server 20 via the browser included in the client PC 10. However, a dedicated client application (not shown) may be installed in the client PC 10, and the user may operate that application. In this example, the client PC 10 and document management server 20 are connected via the LAN 30 as an intranet. However, the present invention is not limited to this, and the client PC 10 and document management server 20 may be connected via the Internet as an external network.

[Hardware Arrangement]

Figure 2:
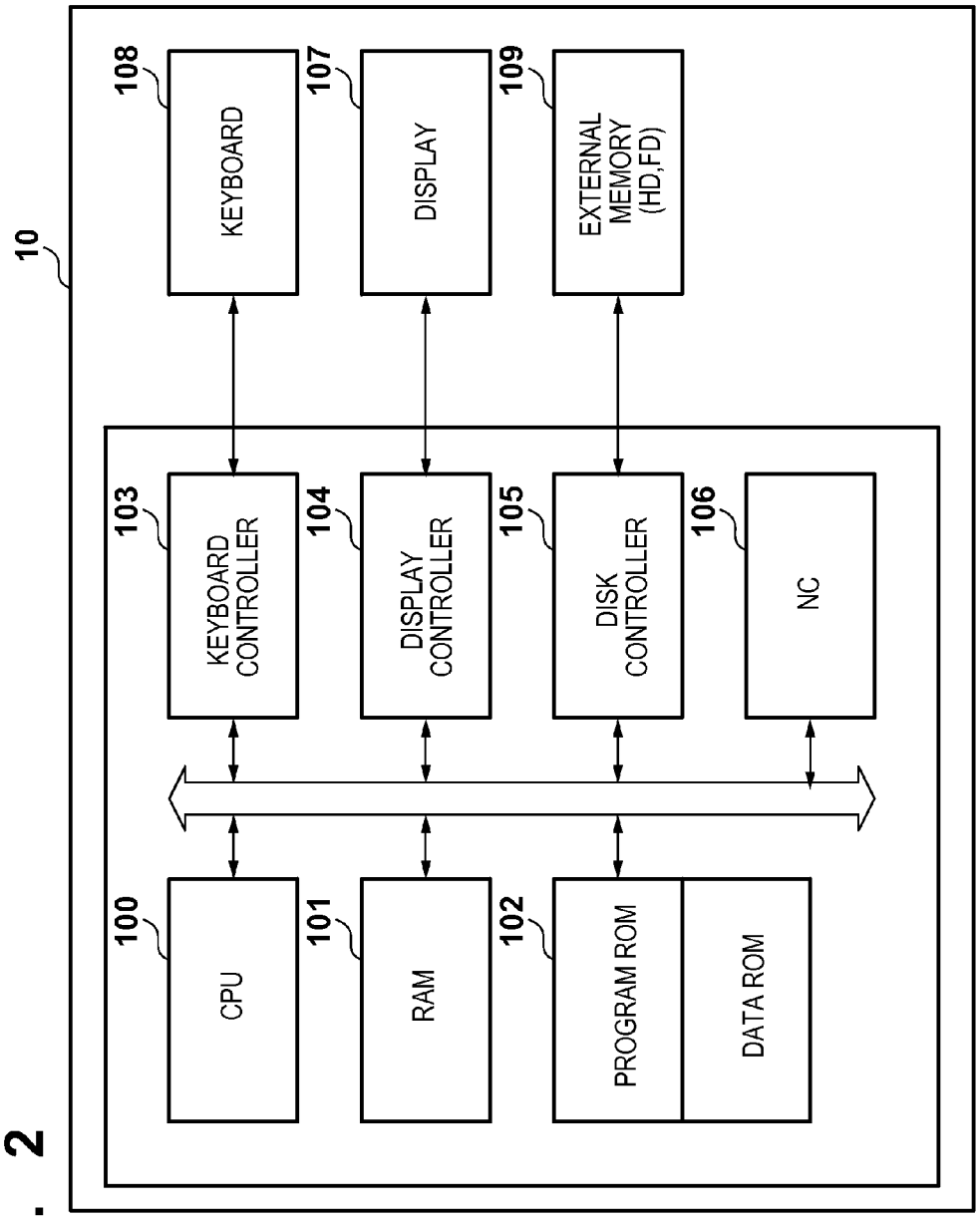
FIG. 2 is a block diagram showing the hardware arrangement of the document management system according to the first embodiment.

FIG. 2 shows the hardware arrangement of a computer which configures the document management system according to this embodiment. Note that the hardware arrangements of the aforementioned client PC 10 and document management server 20 correspond to that of a general information processing apparatus, and the hardware arrangement of the general information processing apparatus shown in FIG. 2 is applicable.

A CPU 100 executes programs such as an OS (Operating System) and applications, which are stored in a program ROM of a ROM 102 or which are loaded from an external memory 109 onto a RAM 101. The CPU 100 functions as respective processing units which execute respective steps of flowcharts to be described later by executing corresponding programs. The RAM 101 functions as a main memory, work memory, and the like of the CPU 100. Respective components included in the client PC 10 are connected via an internal bus.

A keyboard controller 103 controls inputs from a keyboard 108 and a pointing device (not shown) such as a mouse. A display controller 104 controls display of a display 107. A disk controller 105 controls data accesses to the external memory 109 such as a hard disk (HD) and Floppy® disk (FD) used to store various data. A NC 106 is connected to a network, and executes communication control processing with other apparatuses connected to the network.

[Software Arrangement]

Figure 3:
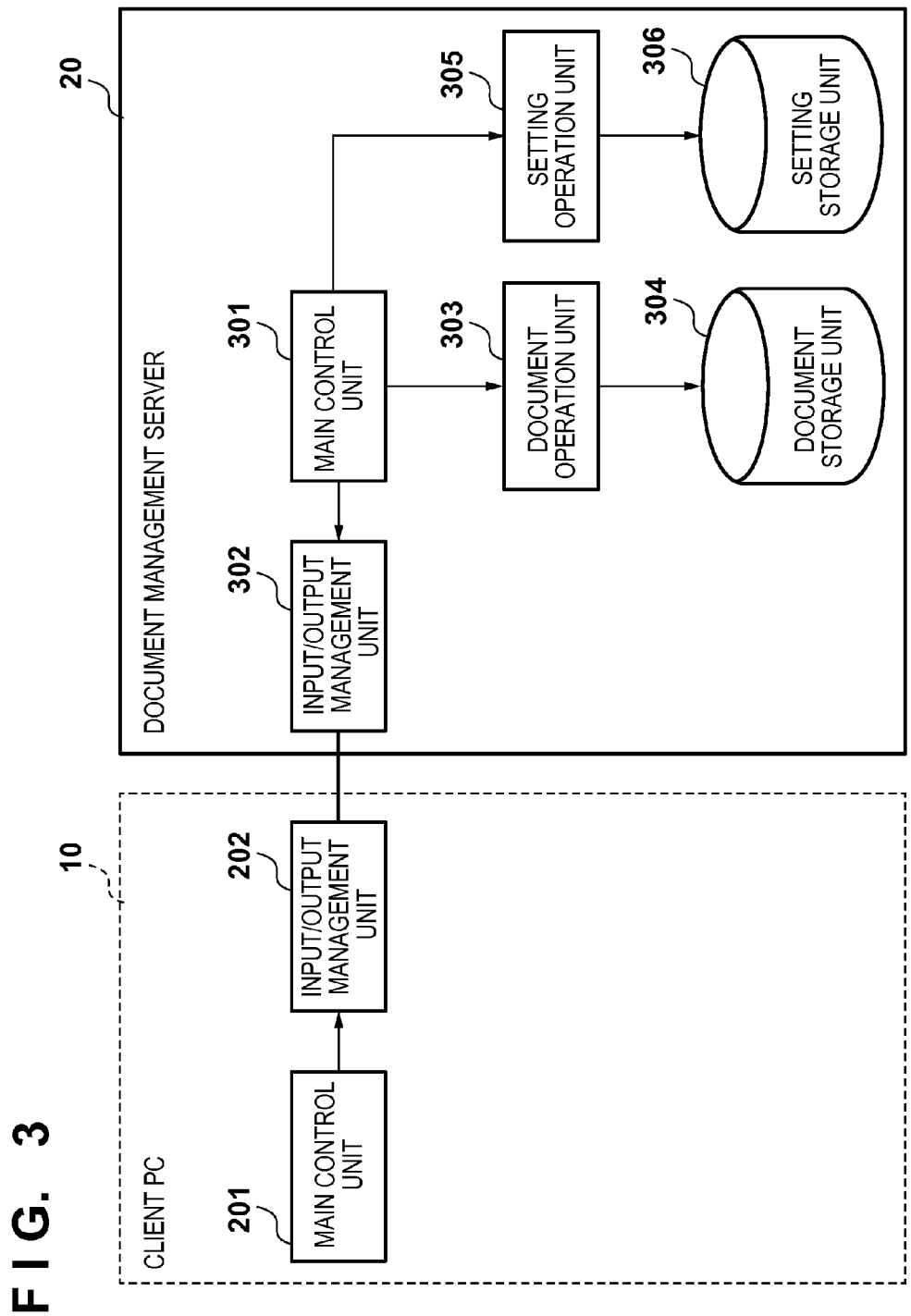
FIG. 3 is a block diagram showing the software arrangement of the document management system according to the first embodiment.

FIG. 3 shows the software arrangement of the computer which configures an example of the document management system according to this embodiment. All functions of the document management system according to this embodiment are implemented by programs executed by the client PC 10 and document management server 20. The client PC 10 and document management server 20 have the hardware arrangement shown in FIG. 2.

The client PC 10 includes the following units. A main control unit 201 controls the overall client PC 10 according to this embodiment, and instructs and manages the respective units included in the client PC 10. An input/output management unit 202 detects an operation of the keyboard 108 by the user, and executes processing according to the operation. Also, the input/output management unit 202 displays a UI (User Interface) on the display 107. Furthermore, the input/output management unit 202 exchanges information via the LAN 30.

The document management server 20 includes the following units. A main control unit 301 controls the overall document management server 20 according to this embodiment, and instructs and manages the respective units included in the document management server 20. An input/output management unit 302 detects an operation of the keyboard 108 by the user, and executes processing according to an operation input. The input/output management unit 302 displays a UI on the display 107. Furthermore, the input/output management unit 302 exchanges information via the LAN 30. A document operation unit 303 instructs to execute processes such as registration, acquisition, and deletion of folders or documents with respect to a document storage unit 304 in accordance with an instruction from the main control unit 301.

The document storage unit 304 stores information of folders and documents. A setting operation unit 305 instructs to register and acquire user settings with respect to a setting storage unit 306 in accordance with an instruction of the main control unit 301. The setting storage unit 306 stores the user settings. The user settings in this case are information set by the user in association with folder search processing, and will be described in detail later.

[Processing Sequence]

Processes in respective steps of the document management system according to this embodiment will be described in detail below using FIGS. 4 to 10. Respective steps of all flowcharts are processes implemented when the document management server 20 executes programs loaded onto the RAM 101, and are instructed by the main control unit 301 which executes the overall programs.

Note that in this embodiment, a folder path indicates a root (hierarchical structure) from a certain upper folder to a folder allocated under the upper folder, and the path is indicated by, for example, an enumeration of folder names. Absolute paths of two folders never match, but path names from an intermediate folder of the absolute paths to respective folders may often match. That is, when folders allocated under folders having different folder names are configured by similar hierarchical structures to have the same folder names, paths under the folders having the different folder names are the same paths.

Processing of the present invention, which sets a certain folder displayed on an operation window as a folder of interest, and searches for similar folders having paths similar to a path of the folder of interest, will be described below.

[Search Pre-Processing]

Figure 4:
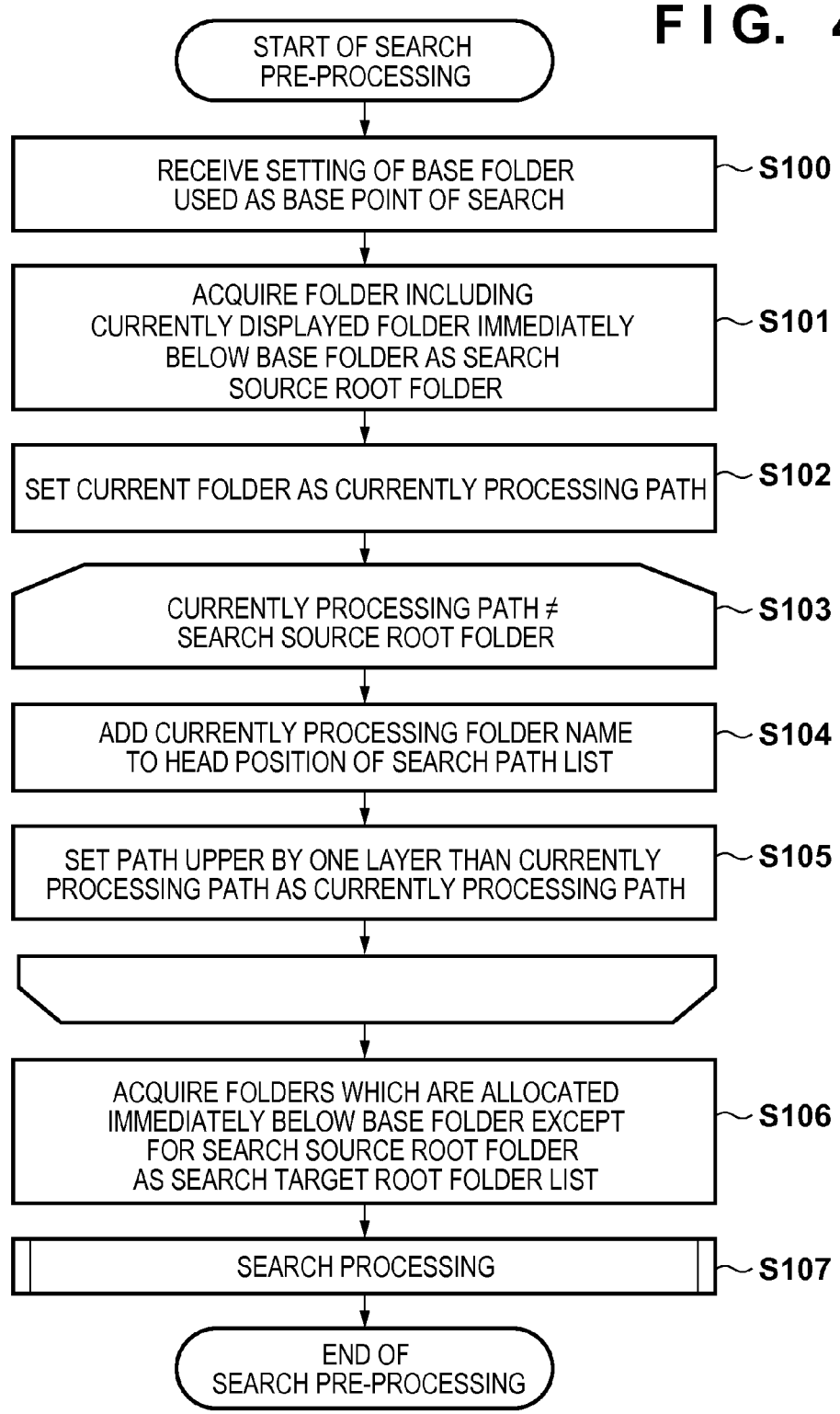
FIG. 4 is a flowchart showing similar folder search preprocessing in the document management system according to the first embodiment.

FIG. 4 is a flowchart showing the sequence for executing pre-processing required for search processing by accepting similar folder search processing and executing processing for calling the search processing in the document management system according to this embodiment. Referring to FIG. 4, step S103 to a loop end symbol after step S105 configure a loop. If it is true in condition determination step S103, processes (S104 and S105) in the loop are repeated. If it is false in condition determination step S103, the control exits the loop, and advances to step S106.

In step S100, the main control unit 301 receives a base folder setting instruction from the client PC 10 via the input/output management unit 302, and stores it in the setting storage unit 306 of the document management server 20. A "base folder" is a folder used as a base point of search processing, and is an upper folder of a display folder (folder of interest) as a comparison target. Thus, the base folder setting is made. A practical example of respective folders defined in the present invention will be described later with reference to FIGS. 6 and 7.

In step S101, the main control unit 301 acquires a folder including the current display folder (folder of interest) as a "search source root folder" of those allocated immediately below the base folder from the document storage unit 304 via the document operation unit 303. That is, the search source root folder indicates a folder having the folder of interest as a lower folder of a plurality of folders allocated immediately below the base folder. Then, the main control unit 301 stores information of the acquired search source root folder in the RAM 101 of the document management server 20. The information of the search source root folder is used when a search path list used as a search condition is extracted in the subsequent steps.

In step S102, the main control unit 301 sets the current display folder as a currently processing path. Step S103 indicates a condition of the loop processing, and the main control unit 301 confirms if the currently processing path is the search source root folder. If the currently processing path is the search source root folder, the control advances to step S106. If the currently processing path is not the search source root folder, processes in steps S104 and S105 are repetitively executed.

In step S104, the main control unit 301 adds a currently processing folder name to a head position of a search path list. Then, the search path list is stored in the RAM 101 of the document management server 20. In this case, the head position of the search path list indicates that when there are folders added to the search path list so far, that folder name is located above these folders. In step S105, the main control unit 301 sets a path upper by one layer than the currently processing path as a currently processing path, and executes determination step S103 again. The search path list is repetitively generated until the search source root folder is reached. That is, by executing the processes in steps S103 to S105, respective folder names which configure a path from a folder immediately under the search source root folder to the folder of interest are obtained as the search path list.

In step S106, the main control unit 301 acquires a folder group, which is allocated immediately below the base folder except for the search source root folder, as a "search target root folder list", and stores it in the RAM 101 of the document management server 20. That is, of a plurality of folders allocated immediately below the base folder, those other than the search source root folder are acquired as search target root folders, and a list of these folders is acquired as the search target root folder list. Note that one search source root folder is specified, and zero or more search target root folders exist. In step S107, the main control unit 301 calls search processing. The search processing will be described below with reference to FIG. 5. After the search processing, this processing sequence ends.

[Search Processing]

Figure 5:
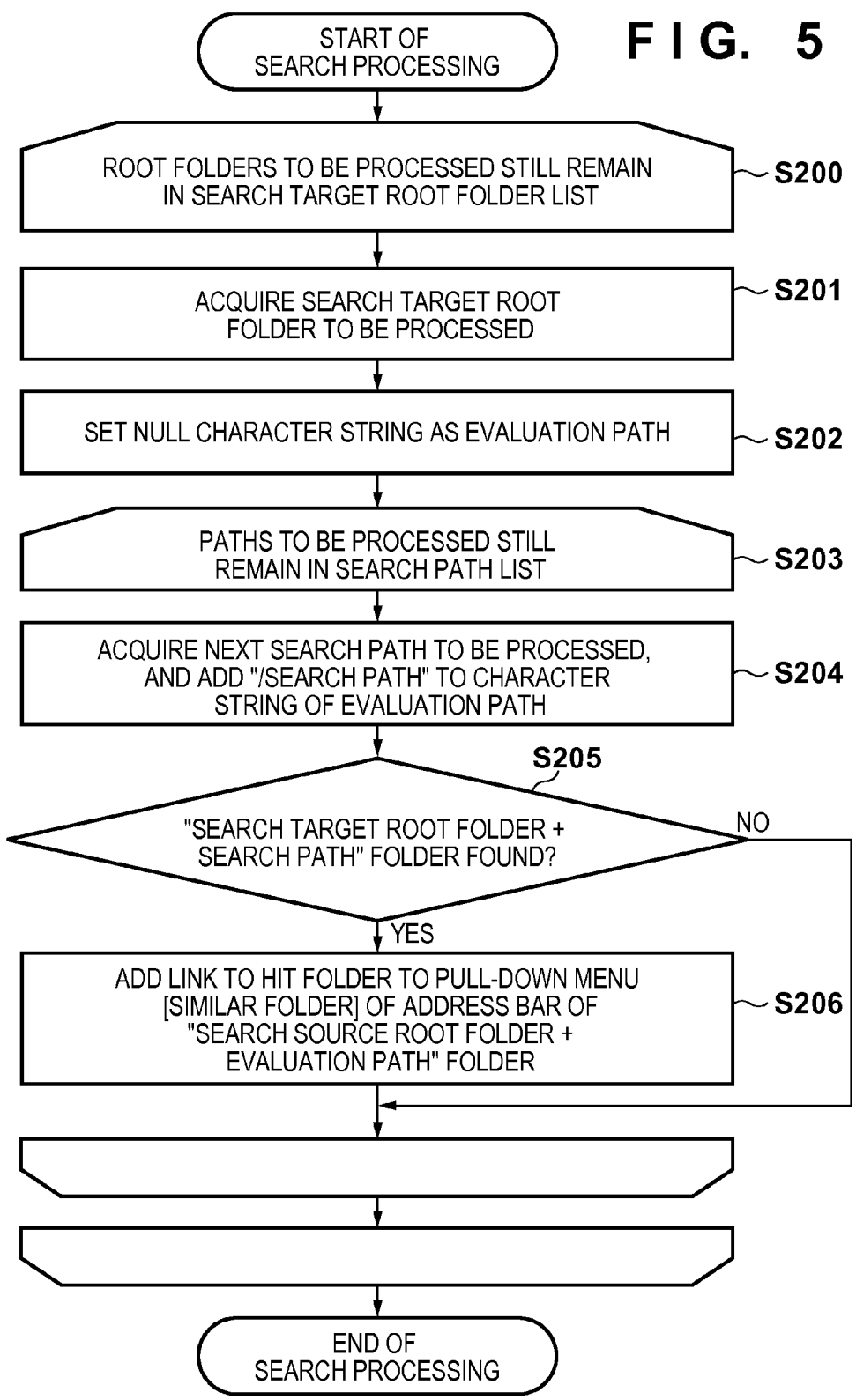
FIG. 5 is a flowchart showing similar folder search processing in the document management system according to the first embodiment.

FIG. 5 is a flowchart showing the sequence for executing the search processing in the document management system according to this embodiment. In FIG. 5, step S200 to a corresponding symbol after step S206 configure a loop. If it is true in condition determination step S200, processes (S201 to S206) in the loop are repeated. If it is false in condition determination step S200, the control exits the loop, and this processing sequence ends. Furthermore, step S203 to another corresponding symbol after step S206 configure another loop, and if it is true in condition determination step S203, processes (S204 to S206) in the loop are repeated. If it is false in condition determination step S203, the control exits the loop and returns to step S200.

The main control unit 301 confirms in step S200 whether or not search target root folders to be processed still remain in the search target root folder list. If no search target root folder to be processed remains, the main control unit 301 ends this search processing. If search target root folders to be processed still remain, the main control unit 301 executes the processes in steps S201 to S206.

In step S201, the main control unit 301 acquires one of the search target root folders to be processed. In step S202, the main control unit 301 sets a null character string as an evaluation path required to execute folder name matching processing.

The main control unit 301 confirms in step S203 whether or not search paths to be processed still remain in the search path list. If no search path to be processed remains, the process returns to step S200 to execute determination step S200 again. If search paths to be processed still remain, the main control unit 301 executes the processes in steps S204 to S206.

In step S204, the main control unit 301 acquires a search path to be processed from the search path list, and updates the evaluation path by adding "/search path" to the character string of the evaluation path. In this case, a character string set as the search path corresponds to a folder name. In this embodiment, the search path to be processed is acquired in turn from the head position of the search path list. The main control unit 301 confirms in step S205 whether or not a folder corresponding to "search target root folder+evaluation path" is allocated under the search target root folder. If no folder is allocated (NO in step S205), the process returns to step S203. If the corresponding folder is allocated (YES in step S205), the process advances to step S206.

In step S206, the main control unit 301 adds a link to the hit folder to a pull-down menu [similar folder] of an address bar of the "search source root folder+evaluation path" folder.

In this way, the processes in steps S201 to S206 are repetitively executed for all the search target root folders, and similar folder search processing in steps S204 to S206 is repetitively executed for each search path in the search path list. Therefore, similar folders are added to the folder of interest and respective folders which configure paths to that folder of interest.

Figure 9:
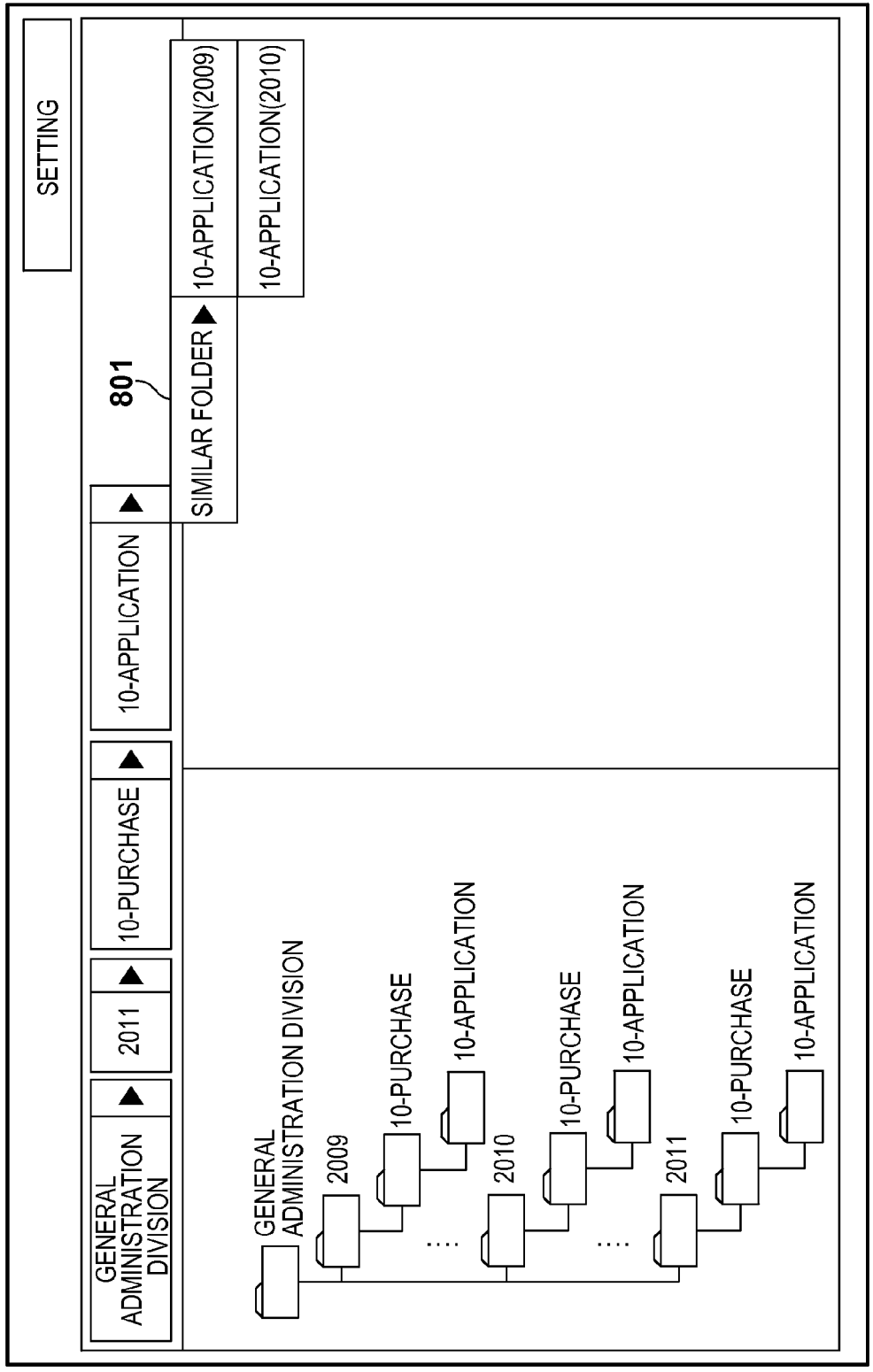
FIG. 9 is a view showing an example of links to similar folders, which are displayed on the operation window after the search processing according to the first embodiment.

Based on the added similar folders, a search result is displayed. Note that FIG. 9 shows a display example. The main control unit 301 executes determination step S203 again.

[Operation Window]

Figure 6:
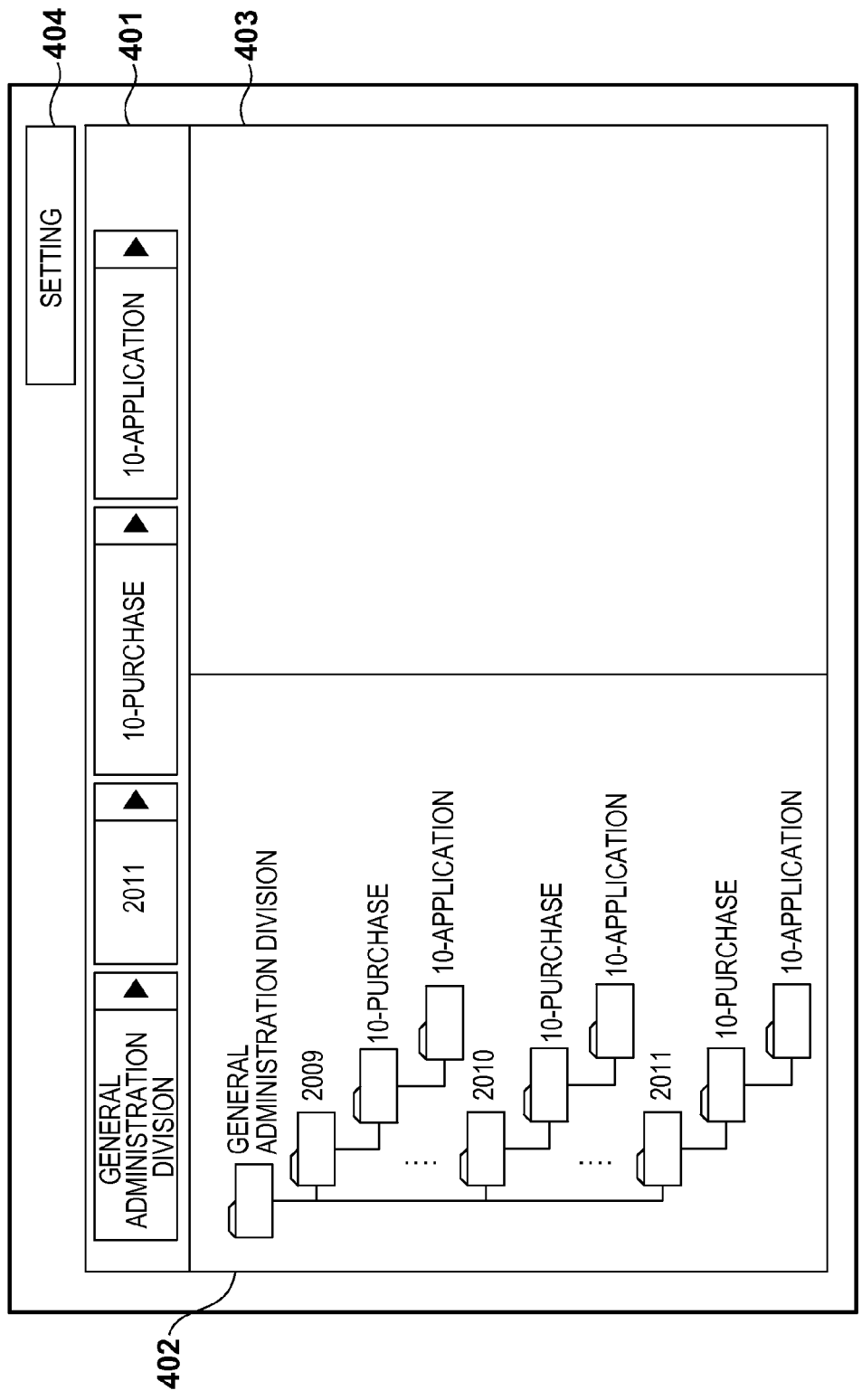
FIG. 6 is a view showing an example of an operation window.

FIG. 6 shows an example of a display window displayed on the client PC 10 in the document management system according to this embodiment. An address bar 401 expresses paths of currently displayed folders in the form of a breadcrumbs list. A pull-down menu is appended to each folder, and allows the user to select an operation menu. Also, the window includes a folder tree 402 and a file list 403 which displays a list of folders or documents included in the currently displayed folder.

When a folder included in the folder tree 402 is selected, a list of documents stored in the selected folder is displayed on the file list 403. A setting button 404 is used to make search settings, and will be described in detail later. In this example, assume that folders "2009", "2010", and "2011" having equivalent hierarchical structures of folders are allocated immediately below a "General Administration Division" folder. The following description will be given under the assumption that the current folder (folder of interest) is a "10-Application" folder under the "2011" folder.

Figure 7:
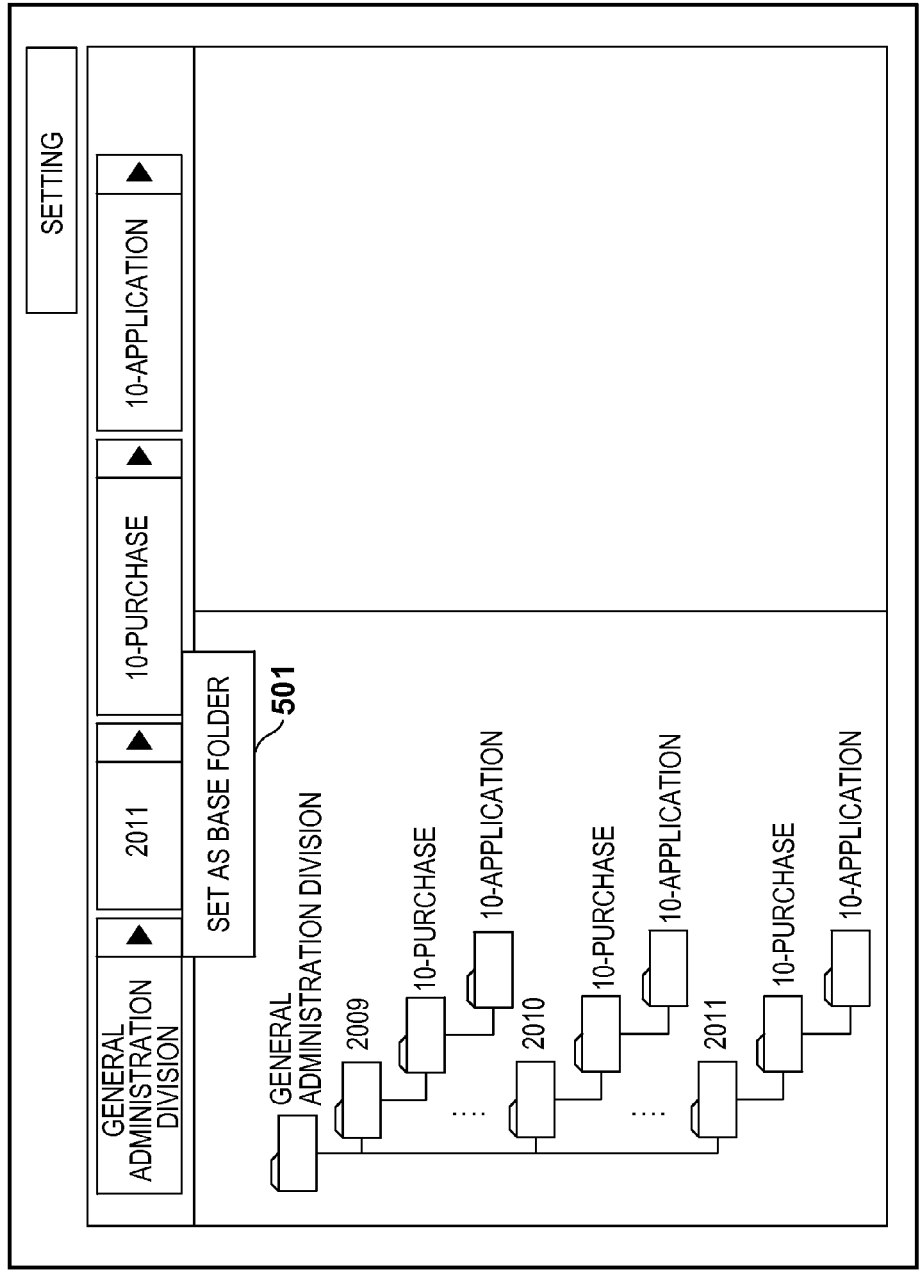
FIG. 7 is a view showing an example of a window used to instruct a base folder on the operation window.

FIG. 7 shows an example of a window used to designate a base folder on the operation window displayed on the client PC 10 in the document management system according to this embodiment. FIG. 7 shows a state in which the user opens a pull-down menu 501 of the "General Administration Division" folder and selects that folder as a base folder. After the base folder is selected, the document management server 20 executes the search pre-processing shown in FIG. 4. In this example, the base folder is the "General Administration Division" folder, the search source root folder is the "2011" folder, and the search target root folders are the "2009" and "2010" folders as folders which are allocated immediately below the base folder except for the search source root folder. As search paths, "10-Purchase" and "10-Application" under the "2011" folder as the search source root folder are set.

Figure 8A:
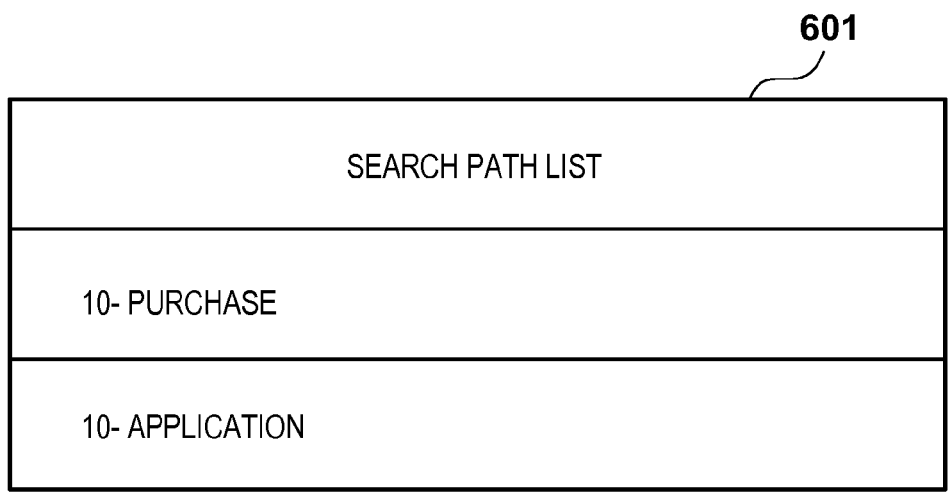
FIGS. 8A and 8B are views showing examples of the data structures of a search path list and search target root folder list.

FIG. 8A shows an example of a data structure which indicates a search path list 601 in the document management system according to this embodiment. Folder names are listed up in turn from an upper folder in association with respective folders from a folder immediately below the search source root folder to the currently displayed folder. FIG. 8A shows an example corresponding to the folder configuration shown in FIG. 6.

Figure 8B:
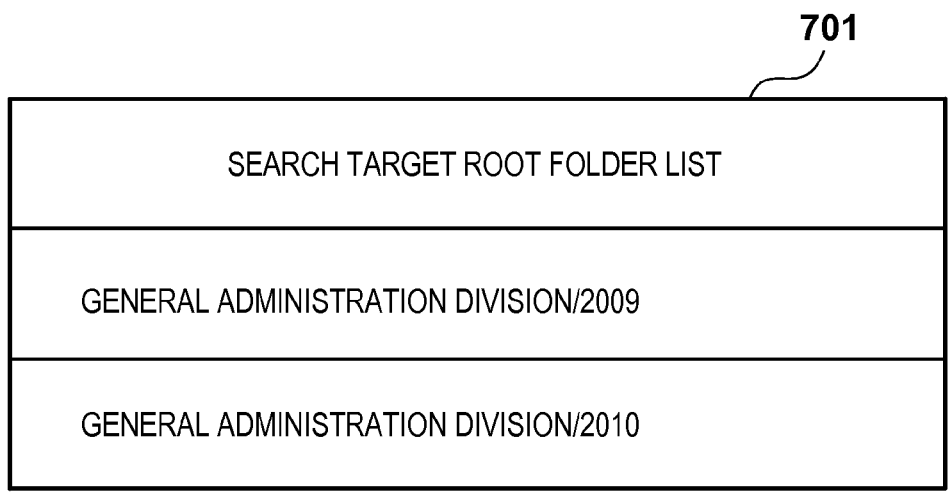

FIG. 8B shows an example of a data structure indicating a search target root folder list 701 in the document management system according to this embodiment. In this list, folders (search target root folders) except for the search source root folder allocated immediately below the base folder are listed up. FIG. 8B shows a configuration example of the search target root folder list corresponding to the folder configuration shown in FIG. 6.

FIG. 9 shows an example of links to similar folders displayed on the operation window of the client PC 10 after the search processing in the document management system according to this embodiment. When the user displays a pull-down menu 801 of the "10-Application" folder and selects an item "similar folder", links associated with similar folders which hit in the search processing and are similar to the "10-Application" folder are displayed as its sub-menus. Note that the display configuration is not limited to this, and other configurations may be used. Although not shown in FIG. 9, a sub-menu of the "10-Purchase" folder, which is located in the middle of the search path, may allow the user to select similar folders.

Note that when transition is made to a link destination via the sub-menu, re-search processing of similar folders may be automatically executed using already set information of the base folder, or a base folder input may be accepted again. When the user selects a link to a similar folder from the sub-menu, a folder at the link destination may be displayed by opening another window.

As described above, according to this embodiment, the user can access a folder similar to the current folder in a small number of steps. Upon displaying the address bar at the access destination folder, re-search processing is executed, thus allowing the user to reciprocally access similar folders.

Second Embodiment

The second embodiment of the present invention will be described below. The system arrangement, hardware arrangement, and software arrangement are the same as those in the document management system according to the first embodiment. Respective steps of all flowcharts are processes implemented when the document management server 20 executes programs loaded onto the RAM 101, and are instructed by the main control unit 301 which executes the overall programs.

[Similar Folder Search Setting Processing]

Figure 10:
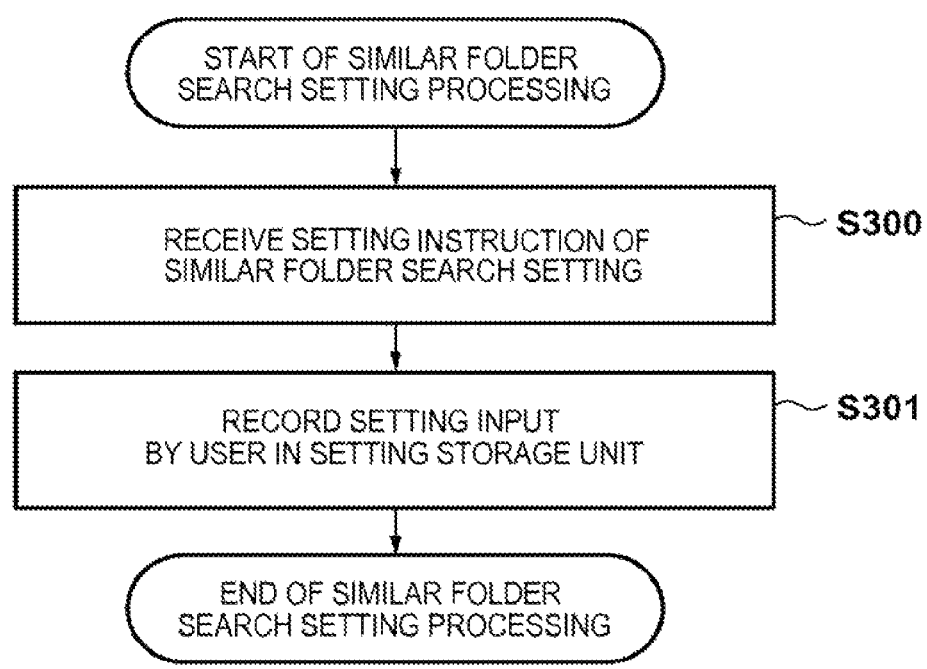
FIG. 10 is a flowchart showing similar folder search setting processing for setting search settings according to the second embodiment.

FIG. 10 is a flowchart showing the sequence for executing similar folder search setting processing in the document management system according to this embodiment. In step S300, the main control unit 301 receives a setting instruction of similar folder search settings from the client PC 10 via the input/output management unit 302. The similar folder search settings used in this case include at least a setting as to whether or not to allow a fluctuating description of a folder name. In step S301, the main control unit 301 stores the settings input by the user in the setting storage unit 306 via the setting operation unit 305.

Figure 11:
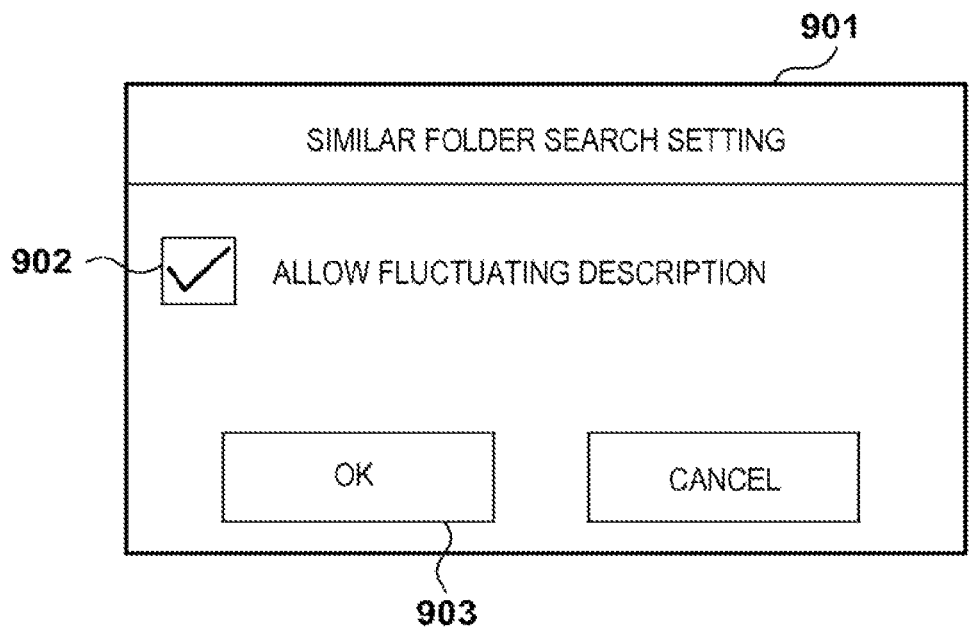
FIG. 11 is a view showing an example of a similar folder search setting window according to the second embodiment.

FIG. 11 shows an example of a similar folder search setting window in the document management system according to this embodiment. A setting window 901 is displayed when the user presses the setting button 404 in FIG. 6. When the user checks a check box 902 included in the setting window 901 to instruct to make a setting which allows a fluctuating description, and then presses an OK button 903, the main control unit 301 executes the similar folder search setting processing shown in FIG. 10.

[Search Pre-Processing]

Figure 12:
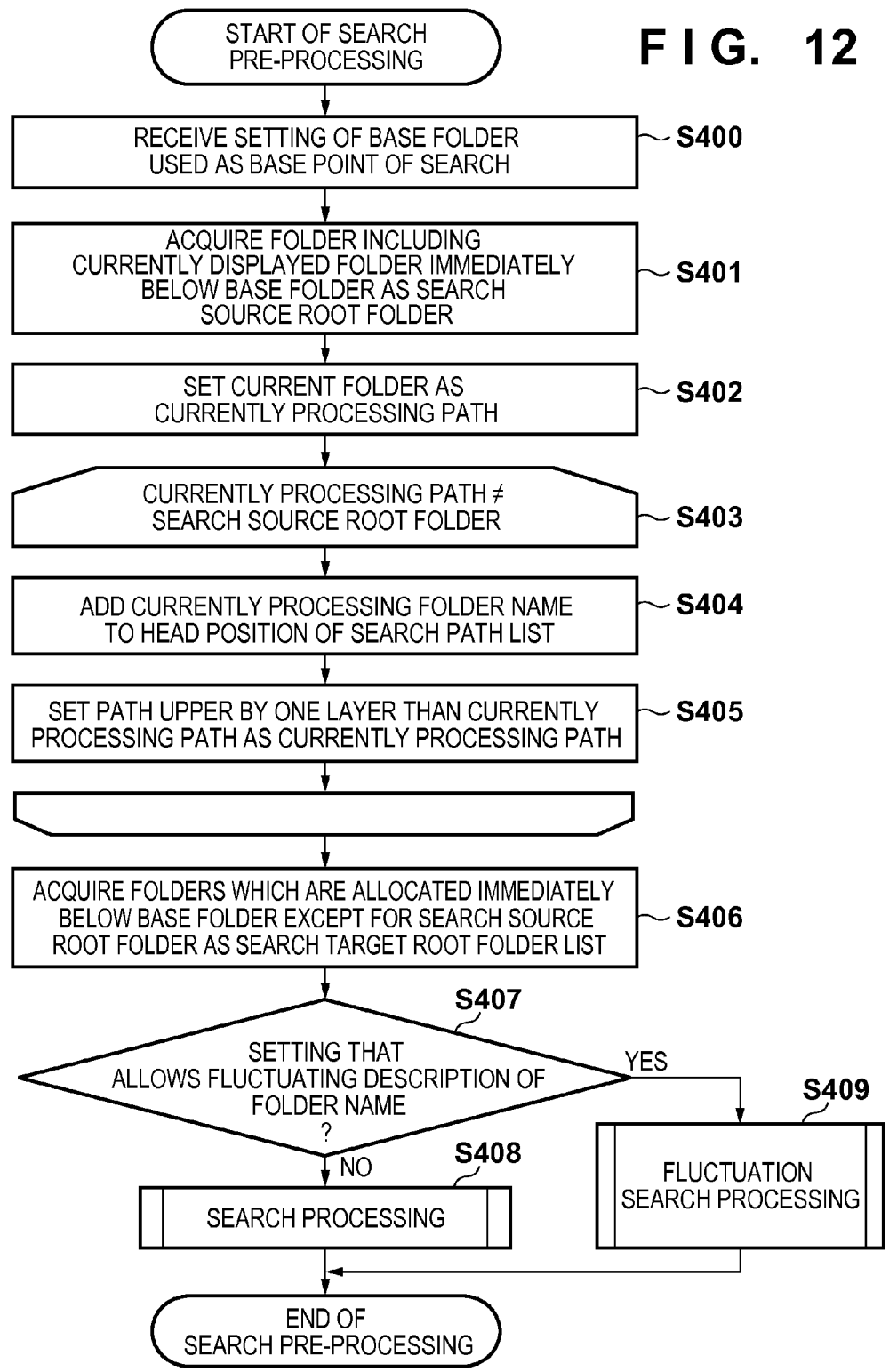
FIG. 12 is a flowchart showing similar folder search preprocessing according to the second embodiment.

FIG. 12 is a flowchart showing the sequence for executing processing for executing pre-processing required for search processing by accepting similar folder search processing, and calling one of the search processing and fluctuation search processing based on the settings in the document management system according to this embodiment. This processing corresponds to that shown in FIG. 4 described in the first embodiment. In FIG. 12, a loop start symbol of step S403 to a corresponding loop end symbol after step S405 configure a loop. If it is true in condition determination step S403, processes (S404 and S405) in the loop are repeated. If it is false in condition determination step S403, the control exits the loop and advances to step S406.

Since steps S400 to S406 are the same as those in FIG. 4, a description thereof will not be repeated. In step S407, the main control unit 301 acquires the settings from the setting storage unit 306 via the setting operation unit 305, and confirms whether or not the acquired settings include that which allows a fluctuating description of a folder name. If the acquired settings include that which allows a fluctuating description (YES in step S407), the process advances to step S409. If the acquired settings do not include any setting which allows a fluctuating description (NO in step S407), the process advances to step S408.

In step S408, the main control unit 301 calls the search processing described using FIG. 5. Since this processing is the same as that in the first embodiment, a description thereof will not be repeated. In step S409, the main control unit 301 calls fluctuation search processing. This processing will be described later using FIG. 13. After completion of the process in step S408 or S409, the main control unit 301 ends this processing sequence.

[Fluctuation Search Processing]

Figure 13:
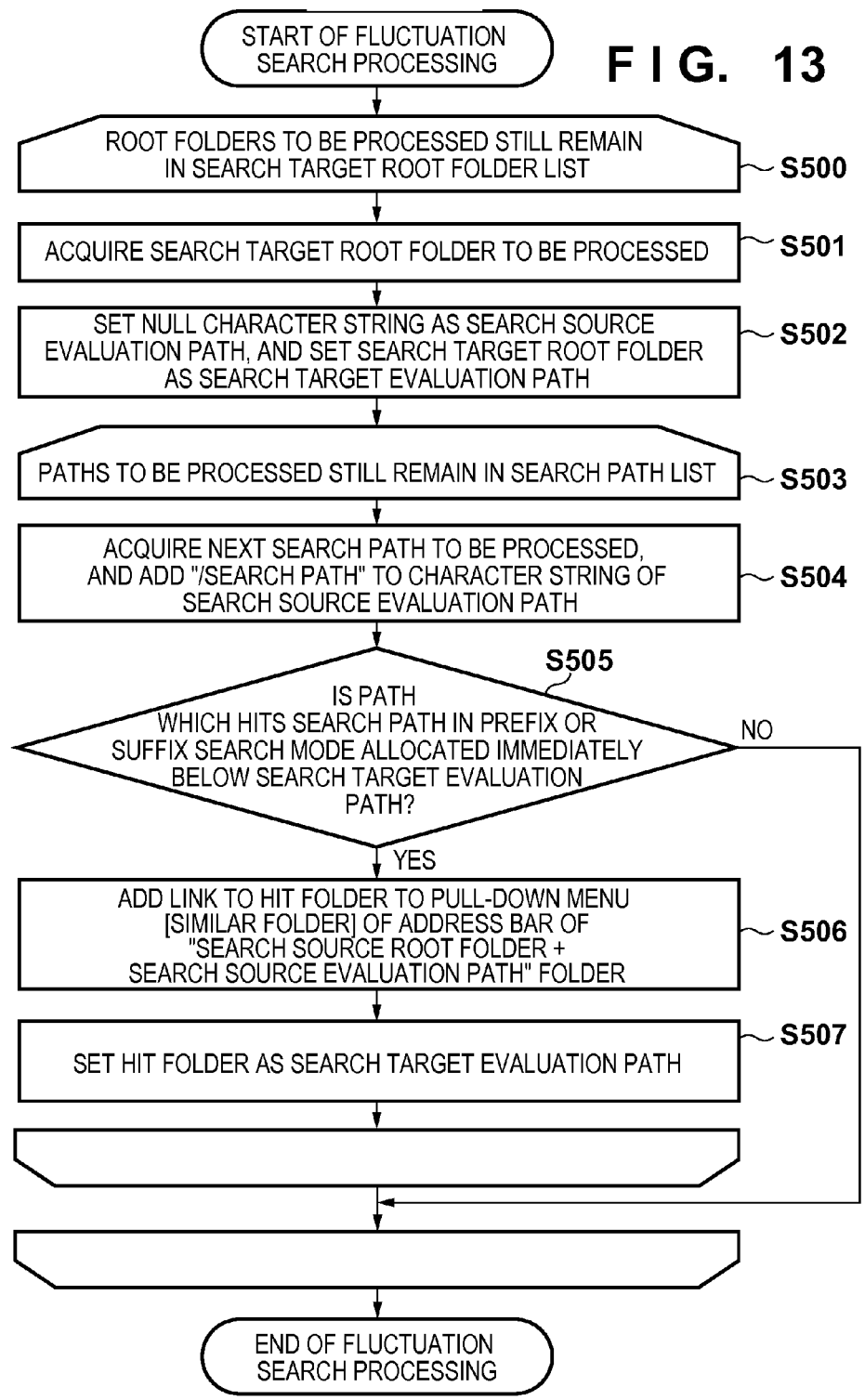
FIG. 13 is a flowchart showing search processing which allows a fluctuating folder name according to the second embodiment.

FIG. 13 is a flowchart showing the sequence for executing search processing when the setting which allows a fluctuating description of folder name is made in the document management system according to this embodiment. In FIG. 13, step S500 to a corresponding symbol after step S507 configure a loop. If it is true in condition determination step S500, processes (S501 to S507) in the loop are repeated. If it is false in condition determination step S500, the control exits the loop and ends this processing sequence. Furthermore, a loop start symbol of step S503 to another corresponding loop end symbol after step S507 configure another loop. If it is true in condition determination step S503, processes (S504 to S507) in the loop are repeated. If it is false in condition determination step S503, the control exits the loop and returns to step S500.

The main control unit 301 confirms in step S500 whether or not folders to be processed still remain in the search target root folder list. If no search target root folder to be processed remains in the search target root folder list, the main control unit 301 ends the search processing. If search target root folders to be processed still remain, the main control unit 301 executes the processes in steps S501 to S507.

In step S501, the main control unit 301 acquires one of search target root folders to be processed. In step S502, the main control unit 301 sets a null character string as a search source evaluation path. The search source evaluation path is used upon adding a link of a similar folder. Furthermore, the main control unit 301 sets a search target root folder as a search target evaluation path. The search target evaluation path is used in the search processing.

The main control unit 301 confirms in step S503 whether or not search paths to be processed still remain in the search path list. If no search path to be processed remains, the process returns to step S500 to execute determination step S500 again. If search paths to be processed still remain, the main control unit 301 executes the processes in steps S504 to S507.

In step S504, the main control unit 301 acquires one of the search paths to be processed, and adds "/search path" to the character string of the search source evaluation path. The main control unit 301 confirms in step S505 whether or not a path which hits the search path in a prefix or suffix search mode exists immediately below the search target evaluation path. If no hit path exists (NO in step S505), the main control unit 301 determines that no similar folder is found, and the process returns to step S500. In this case, as for determination whether or not a path hits the search path, for example, a folder name "Purchase" matches a search path "10-Purchase" in the suffix search mode, and is determined as a hit folder. Note that the search mode of a folder name is not limited to the prefix/suffix search mode, and a partially matched folder name may be detected. For example, a list of words which are more likely to be fluctuations of a certain word (for example, words indicating similar meanings, words to be readily misdescribed, or the like) may be prepared in advance, and a folder name which hits that list may be handled as a hit folder.

In step S506, the main control unit 301 adds a link to a hit folder to a pull-down menu [similar folder] of the address bar of the "search source root folder+search source evaluation path" folder. In step S507, the main control unit 301 sets the hit folder as a search target evaluation path. Then, the process returns to step S503, and the main control unit 301 executes determination step S503 again.

According to this embodiment, a similar folder can be extracted even when it has a slightly different folder name. Hence, more similar folders than the first embodiment can be displayed.

Third Embodiment

The third embodiment of the present invention will be described below. In this embodiment, a system is configured by a single computer. The hardware arrangement of the computer is the same as that in the first embodiment, and a description thereof will not be repeated.

[Software Arrangement]

Figure 14:
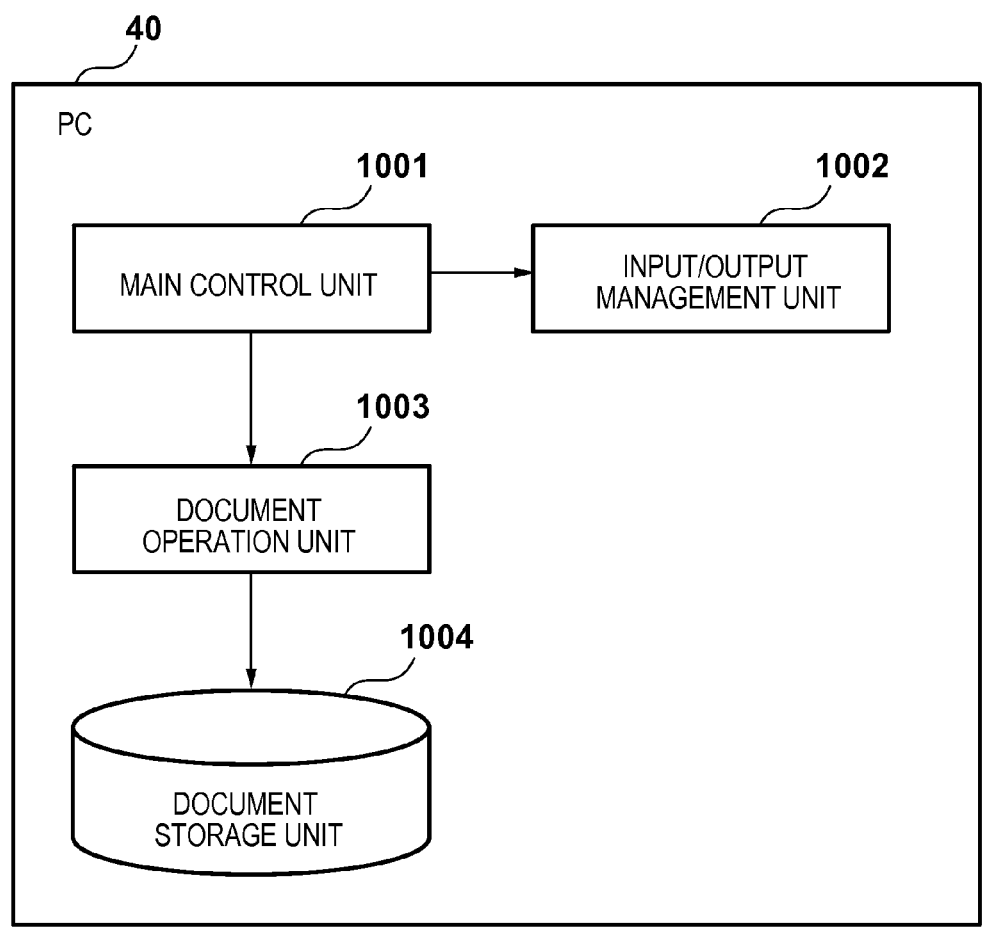
FIG. 14 is a block diagram showing the software arrangement according to the third embodiment.

FIG. 14 shows the software arrangement of the computer which configures an example of a file system of this embodiment. All functions of a document management system according to this embodiment are implemented by programs executed by a PC 40.

The PC 40 includes the following units. A main control unit 1001 controls the overall PC 40 according to this embodiment, and instructs and manages the respective units. An input/output management unit 1002 detects an operation of the keyboard 108 by the user, and executes processing according to the operation. The input/output management unit 1002 displays a UI on the display 107. Furthermore, the input/output management unit 1002 exchanges information via the LAN 30.

A document operation unit 1003 instructs to execute processes such as registration, acquisition, and deletion of folders or documents with respect to a document storage unit 1004 in accordance with an instruction of the main control unit 1001. The document storage unit 1004 registers folders and documents.

Processes in respective steps of the file system according to the third embodiment are the same as those in the flowcharts shown in FIGS. 4 and 5 as those of the first embodiment.

As described above, according to this embodiment, similar folders can be accessed in a smaller number of steps even in navigation of folders in the file system in place of the document management server side. Also, upon displaying an address bar of an access destination folder, re-search processing is executed, thus allowing the user to reciprocally access similar folders.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-231096, filed Oct. 20, 2011, which is hereby incorporated by reference herein in its entirety.

What is claimed is:

1. A document management apparatus comprising:
a processor; and
a memory including instructions that, when executed by the processor, cause the document management apparatus to:
set a base folder used as a base point of search processing from folders which are allocated above a folder of interest;
detect a first folder which has a folder name matching a folder name of the folder of interest, as a similar folder similar to the folder of interest, wherein a path from a folder allocated in a layer lower by one from a folder allocated immediately below the base folder to the first folder matches a path from a folder allocated in a layer lower by one from a folder allocated immediately below the base folder to the folder of interest;
detect, in association with respective folders which configure a path from the base folder to the folder of interest, folders having paths from the base folder, which paths are similar to paths from the base folder to the respective folders, as similar folders similar to the respective folders; and
display, on a display window, a link to a detected similar folder similar to a folder selected by a user from folders of a path displayed on an address bar displayed on the display window.

2. The apparatus according to claim 1, wherein the link to the detected similar folder is displayed in association with a menu of the folder of interest on an address bar displayed on the display window.

3. The apparatus according to claim 2, wherein the address bar displays paths of folders in a form of a breadcrumbs list.

4. The apparatus according to claim 1, wherein the instructions further cause the apparatus to accept a setting as to whether or not to allow a fluctuating description of a folder name of a search target folder, wherein when the instructions cause the apparatus to allow the fluctuating description, a search target folder is detected as the similar folder when a folder name of the folder of interest partially matches a folder name of the search target folder.

5. A control method of a document management apparatus, comprising:

setting a base folder used as a base point of search processing from folders which are allocated above a folder of interest;

detecting a first folder which has a folder name matching a folder name of the folder of interest, as a similar folder similar to the folder of interest, wherein a path from a folder allocated in a layer lower by one from a folder allocated immediately below the base folder to the first folder matches a path from a folder allocated in a layer lower by one from a folder allocated immediately below the base folder to the folder of interest;

detecting, in association with respective folders which configure a path from the base folder to the folder of interest, folders having paths from the base folder, which paths are similar to paths from the base folder to the respective folders, as similar folders similar to the respective folders; and displaying, on a display window, a link to a detected similar folder similar to a folder selected by a user from folders of a path displayed on an address bar displayed on the display window.

6. A non-transitory computer readable medium storing a program for controlling a computer to perform a method comprising:

setting a base folder used as a base point of search processing from folders which are allocated above a folder of interest;

detecting a first folder which has a folder name matching a folder name of the folder of interest, as a similar folder similar to the folder of interest, wherein a path from a folder allocated in a layer lower by one from a folder allocated immediately below the base folder to the first folder matches a path from a folder allocated in a layer lower by one from a folder allocated immediately below the base folder to the folder of interest;

detecting, in association with respective folders which configure a path from the base folder to the folder of interest, folders having paths from the base folder, which paths are similar to paths from the base folder to the respective folders, as similar folders similar to the respective folders; and displaying, on a display window, a link to a detected similar folder similar to a folder selected by a user from folders of a path displayed on an address bar displayed on the display window.

\* \* \* \* \*